United States Patent
Ross et al.

[15] 3,670,835
[45] June 20, 1972

[54] HINGED CLOSURE FOR VEHICLE BOTTOM GUARD STRUCTURE

[72] Inventors: Roy C. Ross; Robert L. Crum, both of Springfield, Ill.

[73] Assignee: Allis-Chalmers Manufacturing Company, Milwaukee, Wis.

[22] Filed: Aug. 31, 1970

[21] Appl. No.: 68,312

[52] U.S. Cl..............................180/69.1, 16/179
[51] Int. Cl......................................B62d 25/20
[58] Field of Search......................180/54 D, 69.1, 1 F, 54 R, 180/69; 16/179

[56] References Cited

UNITED STATES PATENTS

| 1,429,449 | 9/1922 | Norelius | 180/54 D X |
| 2,291,495 | 7/1942 | Beals | 16/179 UX |
| 2,339,731 | 1/1944 | Wheat et al | 180/69.1 X |
| 1,213,848 | 1/1917 | Edgington et al | 180/69.1 |
| 2,931,453 | 4/1960 | Inglese | 180/69.1 |

Primary Examiner—Benjamin Hersh
Assistant Examiner—Milton L. Smith
Attorney—Charles L. Schwab, Robert B. Benson and Kenneth C. McKivett

[57] ABSTRACT

A hinged closure for a bottom guard structure of an off-highway vehicle is secured by releasable means independent of the hinge in such a manner that the hinge pin is not subjected to load when the closure encounters an obstruction during vehicle operation.

9 Claims, 8 Drawing Figures

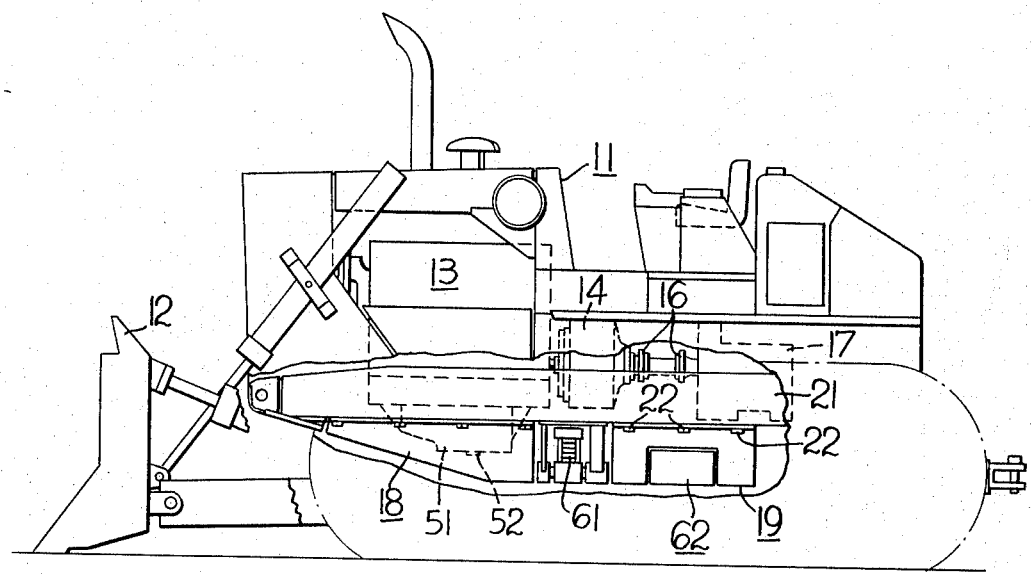
Fig. 1
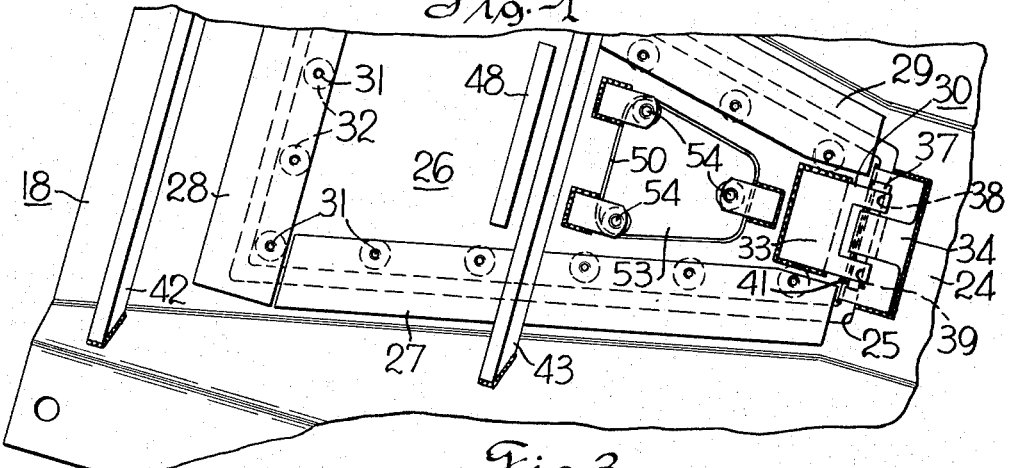
Fig. 3
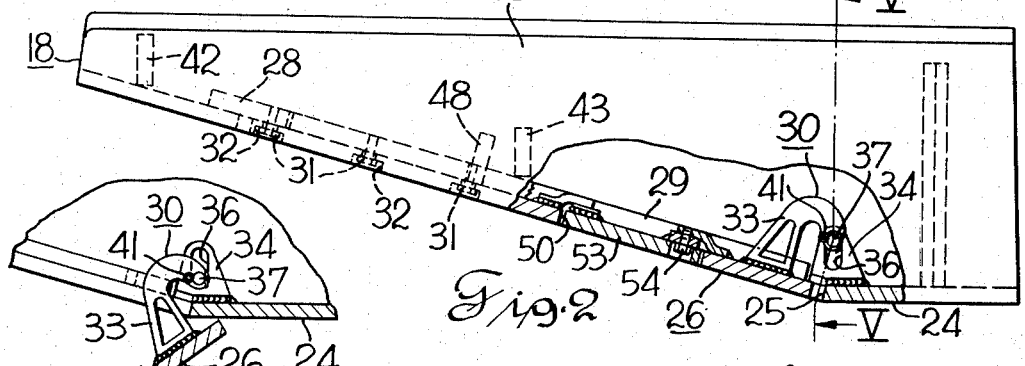
Fig. 2
Fig. 4
Inventors
Ross C. Ross
Robert L. Crum

HINGED CLOSURE FOR VEHICLE BOTTOM GUARD STRUCTURE

This invention relates to a hinged closure in the bottom of a bottom guard structure for a vehicle and particularly to means for hinging the closure in such a manner that impact loads imposed thereon during vehicle operation are transmitted to the bottom guard structure independent of the hinge.

Off-highway vehicles such as crawler tractors are equipped with bottom guard structures to prevent damage to components such as the engine, transmission, torque converter and the like. In large vehicles removal of these guard structures for clean-out, inspection or servicing is a problem to the serviceman in that the guard structures are quite heavy and awkward to handle. The present invention provides a closure for an opening in the guard structure which is hinged so that it may be opened by one man, to permit access to the parts on the underside of the tractor, without resorting to use of jacks or special tools.

Although others have provided underguard structures, such as disclosed in U.S. Pat. No. 1,213,848, these prior designs are not entirely satisfactory, particularly in that the hinge is subjected to external loads encountered by the guard structure.

It is an object of the present invention to provide a hinged closure for the bottom guard structure of off-highway equipment wherein external loads imposed on the hinged closure are not transmitted to the hinge pins, thus obviating hinge failures which would otherwise be incurred due to such external loads.

It is a further object of the present invention to provide an improved hinged guard arrangement for off-highway vehicles, wherein the hinged closure may be opened by a single person without special mechanical equipment, such as a jack for lowering, and the like.

It is a further object of the present invention to provide the hinged closure for the underside of an off-highway vehicle which is secured by the plurality of releasable fastening means and a hinge connection wherein the hinged closure is removable upon release of the releasable fastening means and removal of the hinge pin.

It is a further object of the present invention to provide a hinged bottom closure for an opening in a vehicle bottom guard structure wherein the closure and hinge are so designed and installed that external loads are transmitted from the closure to the bottom guard structure independent of the hinge.

These and other objects of the present invention will be apparent to those familiar with the art when the following description is read in conjunction with the drawings in which:

FIG. 1 is a side view of a crawler tractor with parts broken away to show incorporation of the present invention;

FIG. 2 is a side view of the bottom guard on the underside of the engine;

FIG. 3 is a top view of the bottom guard shown in FIG. 2;

FIG. 4 is a section view similar to FIG. 2 but showing the hinged closure in an open position;

Figure 6:
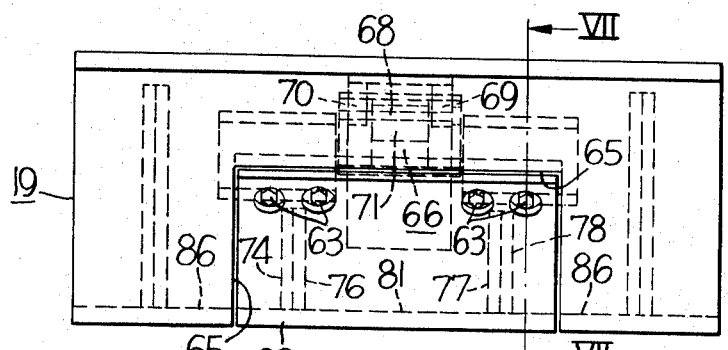
FIG. 6 is a side view of the bottom guard for the torque converter and transmission area of the tractor.

Referring to FIG. 1, a crawler tractor 11 is illustrated on which a bulldozer attachment 12 is installed. The tractor includes an engine 13 which is connected to conventional endless track belts by a drive train including a torque converter 14, universal joints 16 and a change-speed transmission 17.

In order to protect the underside of the engine 13 and the other power train components 14, 16, 17, engine bottom guard structure 18 and transmission bottom guard structure 19 are rigidly secured to the main frame 21 of the crawler tractor 11 by releasable fastening means in the form of cap screws 22. Presently crawler tractors with bulldozer attachments, such as illustrated in FIG. 1, are being marketed which exceed 70 tons in weight. In such a tractor, the guard structure 18, 19 are too heavy for a single man to conveniently handle. However, it is desirable to provide some means by which a single serviceman can obtain access to the underside of the engine and the torque converter and transmission area to clean out debris, inspect for leaks and do minor servicing. The present invention provides openings 25, 65 in the bottom guard structures 18, 19 in which hinged closures 26, 62 are releasably mounted.

Referring to FIG. 2, the engine bottom guard structure 18 includes walls 24, 27, 28, 29 which define the bottom opening 25 in which the closure 26 is rigidly secured by releasable fastening means in the form of cap screws 31 which have their head portions recessed in counterbores 32 so as not to catch on boulders or the like that may scrape against the bottom guard structure 18. The closure 26 slopes upwardly from rear to front and has its rear end pivotally connected on a transverse axis to a bottom wall 24 of the engine guard structure 18 by a hinge 30 having parts 33, 34 secured as by welding to the hinged section 26 and the wall 24, respectively. The hinge part 34 has the vertically extending slot 36 through which a horizontally disposed hinge pin 37 extends to provide a lost motion connection between the hinge parts. The hinge pin 37 passes through aligned holes 38, 39 in part 33 and is releasably held in place by a cotter pin 41.

Figure 5:
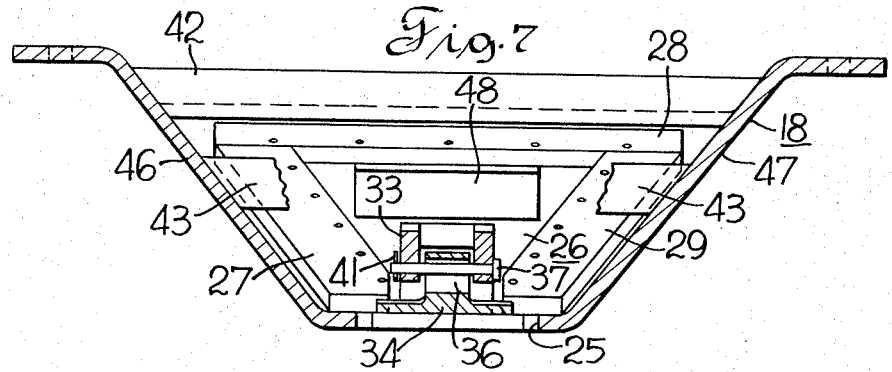
FIG. 5 is a section view taken on line V—V in FIG. 2.

When the operator or serviceman desires to gain access to the bottom side of the engine, he will remove the cap screws 31 and allow the hinged closure 26 to swing downwardly, as shown in FIG. 4, about the pivot effected by cooperation between the lower end of the slot 36 and the hinge pin 37. The weight of hinged section 26 in a typical large crawler tractor will be such that a single man can handle the opening of the closure 26. If it is desired to completely remove the closure 26, it will also be necessary to remove the cotter pin 41 and then remove the hinge pin 37. The construction of the hinge parts 33, 34, and their cooperation with hinge pin 37, is also shown in FIG. 5. Referring to FIGS. 2, 3 and 5, the engine bottom guard structure 18 is reinforced by transverse braces 42, 43 secured as by welding to the upwardly diverging sidewalls 46, 47. The flat closure 26 is reinforced by an up-standing transverse member 48 secured by as welding thereto. In the event the serviceman wishes to gain access to the underside of the engine to merely drain the oil from the engine oil pan 51 through drain plug 52, a small opening 50 is provided in the hinged section 26 directly below the drain plug 52. A plate 53 closing the opening 50 may be removed from the hinged closure 26 by removing three cap screws 54. Since in the installed condition of the closure 26, as shown in FIGS. 2 and 5, the hinge pin 37 is not against the upper end of the slot 36. It is obvious that external forces imposed on the hinged closure 26 will not be imposed on the hinge pin. Thus, damage to the hinge pin is avoided.

Figure 7:
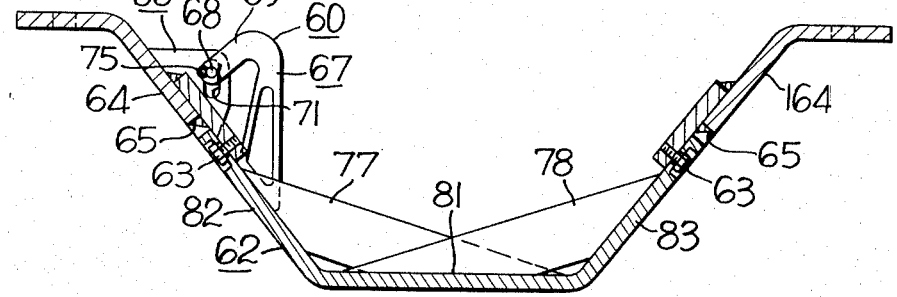
FIG. 7 is a section view taken on the line VII—VII in FIG. 6.

The bottom guard 19 for the torque converter 14, universal joints 16 and transmission 17 is disposed to the rear of the transverse equalizer mechanism 61 and includes a hinged closure 62 which, as shown in FIGS. 6 and 7, is rigidly secured to the guard structure 19 by a plurality of cap screws 63 and covers the opening 164 defined by the side walls 64, 65 and a bottom wall 86. In the installed condition of the closure 62, the hinge pin is in an intermediate position in slot 71 and hence, is not subject to loads during vehicle operation.

Figure 8:
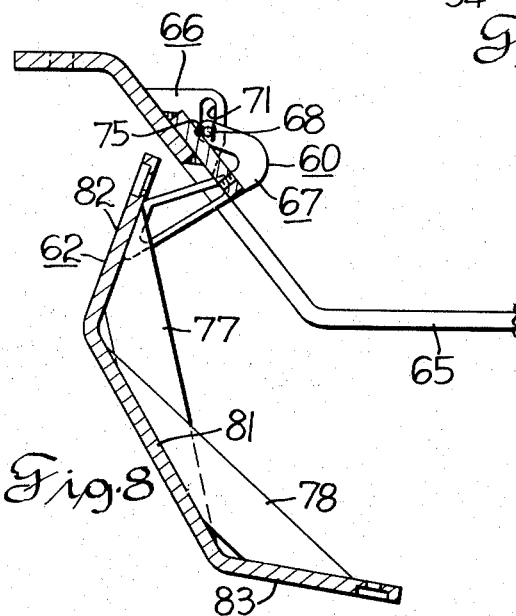
FIG. 8 is a section view similar to FIG. 7 but showing the closure in an open position.

The hinged closure 62 is pivotally connected to the side wall 64 by a hinge 60 including hinge parts 66 and 67 welded to the wall 64 and the closure 62, respectively, and interconnected by a horizontal hinge pin 68. The hinge pin 68 extends through aligned holes in longitudinally spaced fingers 69, 70 of hinge part 67 and the central part of pin 68 passes through a vertically extending slot 71 in hinge part 66. The hinge pin 68 is releasably secured in place by a cotter pin 75. The bottom guard structure 19 is not normally removed during routine servicing of the torque converter and transmission components of the tractor. Rather, the operator or serviceman gains access to these power train components by removing the cap screws 63 and allowing the hinged closure 62 to swing downwardly about the longitudinal pivot axis of hinge 60 to the position shown in FIG. 8. The hinged closure 62 is reinforced by transverse brace member 74, 76, 77, 78 which are rigidly secured by welding to the horizontal bottom side 81 and upwardly and laterally outwardly diverging sides 82, 83.

From the foregoing description it is apparent that rugged bottom guard structures 18, 19 are provided for a crawler tractor to protect the engine and drive train components of an off-highway vehicle against damage when the tractor encounters obstructions such as boulders ans stumps. It also is evident that the present invention will permit access to the underside of the engine and other drive train components for servicing and the like through provision of hinged closures 26, 62 which, when installed, cover bottom openings 25, 65 in the bottom guard structures 18, 19. If desired, the hinged closures 26, 62 can be completely removed by removing cap screws 31, 63 and the cotter pins 41, 75 from the pivot pins 37, 68 and withdrawing the latter from their associated hinge parts. In both the front and rear bottom guard structures 18, 19, it will be noted that when the hinged sections 26, 62 are secured by cap screws 31, 63, external forces imposed upon the hinged closures 26, 62 will not be transmitted between hinged parts 33, 34 or between hinge parts 66, 67. Accordingly hinge pins 37, 68 will not be subject to stress in the installed condition of the closure 26, 62.

The embodiments of the invention in which an exclusive property or privilege is claimed are defined as follows:

1. In an off-highway vehicle having a main frame and a bottom guard structure secured to and disposed beneath the main frame, the combination comprising:
   walls in said bottom guard structure defining a bottom opening therein through which a serviceman has access to the space above the bottom guard structure,
   a closure for said opening,
   a releasable fastening means rigidly securing said closure to said bottom guard structure and
   a hinge for said closure having
      parts secured to said closure and bottom guard structure, respectively, said hinge parts being disposed above said bottom guard structure and said closure, and
      means effecting a lost motion connection between said parts whereby force is not transmitted between said parts when said closure is secured by said releasable fastening means.

2. The invention of claim 1 wherein said means effecting a lost motion connection between said parts include a vertically extending slot in one of said parts and a horizontally disposed pin in the other of said parts.

3. The invention of claim 2 wherein said closure includes reinforcing means rigidly secured to its upper side.

4. The invention of claim 3 wherein said closure slopes upwardly from rear to front.

5. The invention of claim 1 wherein said closure includes bottom and upwardly and laterally outwardly diverging sides.

6. The invention of claim 5 wherein said means effecting a lost motion connection between said parts include a vertically extending slot in one of said parts and a horizontally disposed pin in the other of said parts.

7. The invention of claim 6 wherein the axis of said pin is longitudinally disposed.

8. The invention of claim 7 wherein said pin is releasably secured to said other part.

9. The invention of claim 8 wherein said closure is reinforced by brace members rigidly secured to said bottom and upwardly and laterally diverging sides.

* * * * *